United States Patent
Zayats et al.

(10) Patent No.: US 11,314,711 B2
(45) Date of Patent: Apr. 26, 2022

(54) NETWORK SWITCH WITH NETWORK ANALYSIS DATA PRODUCER-CONSUMER SHARED MEMORY

(71) Applicant: Hewlett Packard Enterprise Development LP, Houston, TX (US)

(72) Inventors: Michael Zayats, Mountain View, CA (US); Frank A. Reichstein, Rocklin, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 306 days.

(21) Appl. No.: 16/262,801

(22) Filed: Jan. 30, 2019

(65) Prior Publication Data
US 2020/0242096 A1 Jul. 30, 2020

(51) Int. Cl.
| | |
|---|---|
| *G06F 17/30* | (2006.01) |
| *G06F 16/22* | (2019.01) |
| *G06F 9/54* | (2006.01) |
| *G06F 15/173* | (2006.01) |
| *G06F 16/2455* | (2019.01) |

(52) U.S. Cl.
CPC .......... *G06F 16/2272* (2019.01); *G06F 9/547* (2013.01); *G06F 15/17331* (2013.01); *G06F 16/2455* (2019.01)

(58) Field of Classification Search
CPC ........ G06F 16/13; G06F 16/24; G06F 16/156; G06F 13/28; G06F 9/546; G06N 3/00; G06N 5/00; G05B 13/00; H04L 65/1069
See application file for complete search history.

(56) References Cited

U.S. PATENT DOCUMENTS

| | | | | |
|---|---|---|---|---|
| 6,301,224 B1* | 10/2001 | Rijhsinghani | ............ | H04B 1/74 370/227 |
| 6,912,637 B1* | 6/2005 | Herbst | ..................... | H04L 12/46 709/200 |
| 6,993,027 B1* | 1/2006 | Kadambi | .............. | H04L 47/125 370/358 |
| 7,184,441 B1* | 2/2007 | Kadambi | ................ | H04L 12/46 370/400 |
| 7,424,702 B1* | 9/2008 | Vinodkrishnan | ...... | G06Q 10/06 717/124 |
| 7,702,778 B2 | 4/2010 | Parupudi et al. | | |
| 9,361,338 B2 | 6/2016 | Pathak et al. | | |
| 9,756,184 B2 | 9/2017 | Barinov et al. | | |

(Continued)

OTHER PUBLICATIONS

EOS: the Next Generation Extensible Operating System, (Research Paper), Retrieved Nov. 3, 2018, 8 Pgs.

(Continued)

*Primary Examiner* — Hung D Le
(74) *Attorney, Agent, or Firm* — Rathe Lindenbaum LLP

(57) ABSTRACT

A network switch may include a database, a network analysis data producer having a first application program interface, a network analysis data consumer having a second application program interface and a shared memory accessible by the first application program interface and the second application program interface. The network analysis data producer is to store network analysis data on a region of the shared memory and store an index to the region in the database for retrieval by the network analysis data consumer.

18 Claims, 2 Drawing Sheets

(56) References Cited

U.S. PATENT DOCUMENTS

| | | | | |
|---|---|---|---|---|
| 2005/0047411 A1* | 3/2005 | Kadambi | ............ | H04L 12/4641 |
| | | | | 370/389 |
| 2005/0180429 A1* | 8/2005 | Ghahremani | ........... | H04L 47/24 |
| | | | | 370/395.21 |
| 2014/0258243 A1* | 9/2014 | Bell | ........................ | G06F 16/23 |
| | | | | 707/690 |
| 2015/0294316 A1* | 10/2015 | Eisen | ..................... | G06Q 40/12 |
| | | | | 705/30 |
| 2015/0326505 A1* | 11/2015 | Chippa | ............... | G06F 9/45533 |
| | | | | 709/226 |
| 2018/0101589 A1* | 4/2018 | Shi | ........................ | G06F 16/273 |
| 2019/0354624 A1* | 11/2019 | Seshadri | ................ | G06F 16/23 |

OTHER PUBLICATIONS

Gude, N. et al., NOX: Towards an Operating System for Networks, (Research Paper), Jun. 11, 2008, Retrieved Nov. 3, 2018, 6 Pgs.

\* cited by examiner

NETWORK SWITCH WITH NETWORK ANALYSIS DATA PRODUCER-CONSUMER SHARED MEMORY

BACKGROUND

Network switches are utilized in networks to route communications within a communications network. Switch performance and network performance are sometimes analyzed to adjust operation of the switch to improve performance and security of the switch and/or network.

Figure 1:
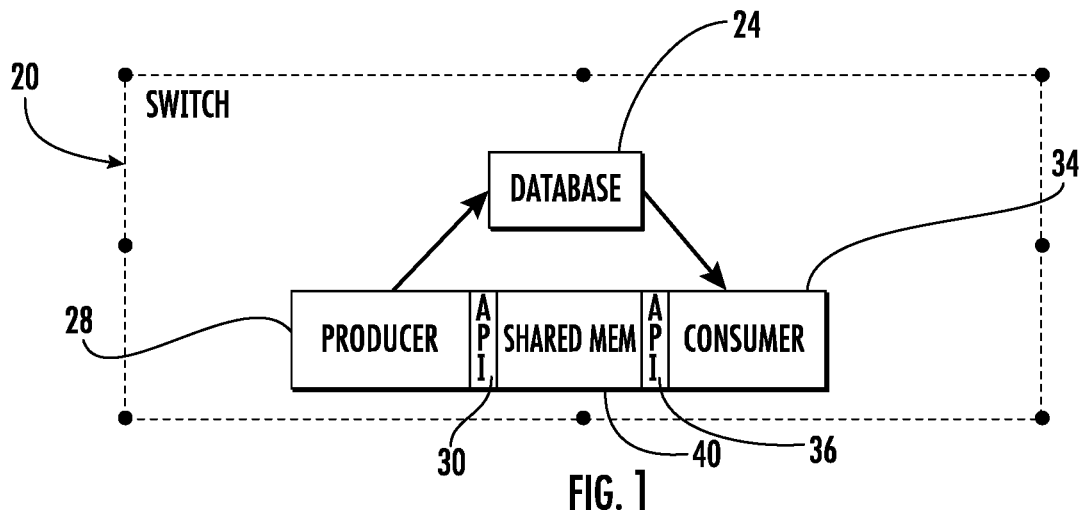
FIG. 1 is a block diagram schematically illustrating portions of an example network switch.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed herein are example network switches, example switch performance data storage and retrieval methods and network switch computer-readable mediums that facilitate the storage and provision of switch performance data in a timely and efficient manner while reducing the consumption of switch resources for the storage and provision of such switch performance data.

Many existing network switches track various performance data. Such performance data may be used to alter operations of the switch or other network parameters to identify security issues or to enhance traffic flow through a switch or within the network. For example, many switches may include multiple counters that track traffic through the switch, such as traffic through particular ports, traffic through particular VLANs traffic through particular flow paths through the switch, traffic to or between virtual ports in the switch, the number of packets over time within a given queue, the time spent by a packet in a queue and the like.

The producer of the switch performance data, such as the counters, may store the performance data in a switch database which is accessed by a network analytics consumer, such as an analytics application, to retrieve such switch performance data. Due to the high frequency at which packets or communications may be received by a switch, are processed by the switch or are transmitted from the switch, the switch performance data also changes at a high frequency. Due to the database overhead associated with copying of the data and outputting notifications to subscribers of the database, continually updating the database with new switch performance data may at times be impractical or may consume exorbitant amounts of switch resources.

The example network switches, example switch performance data storage and retrieval methods and network switch computer-readable mediums reduce database overhead by reducing reliance upon switch database to maintain updated switch performance data. In particular, the example network switches, example switch performance data storage and retrieval methods and network switch computer-readable mediums utilize a shared memory between the producer of the switch performance data and the consumer of the switch performance data. Updates to the switch performance data are made to the shared memory rather than the database.

When tracking of a particular switch attribute is begun, the switch data producer, such as a counter of the switch, stores an index value in the database identifying a particular region of the shared memory at which the associated switch performance data is stored by the producer. The switch data producer updates the tracked switch attribute at the index region of the shared memory. Because the updates to the tracked switch performance data are not stored in the database and are not processed by the database, but are stored in the shared memory which has a lower degree of processing overhead, database overhead is reduced and switch resources are conserved.

The network analytics consumer of the switch data reads the database to retrieve the index value for any desired switch performance data. Once the index value has been retrieved by the consumer, the consumer uses the retrieved index going forward to retrieve the switch performance data from the index region of the shared memory. The index associated with the switch performance data desired by the network analytics consumer may be stored by the consumer such that the index is no longer retrieved from the database, further reducing database processing overhead.

Disclosed herein is an example network switch that may include a database, a network analysis data producer having a first application program interface, a network analysis data consumer having a second application program interface and a shared memory accessible by the first application program interface and the second application program interface. The network analysis data producer is to store network analysis data on a region of the shared memory and store an index to the region in the database for retrieval by the network analysis data consumer.

Disclosed herein is an example switch performance data storage and retrieval method. The method comprises storing, with an application program interface of a network analysis data producer, network analysis data in region of a shared memory and storing an index to the region in a database. The method may further comprise retrieving, with a network analysis data consumer, the index from the database and retrieving, with an application program interface of the network analysis data consumer, the network analysis data from the region of the shared memory using the index.

Disclosed herein is an example non-transitory computer-readable medium on a network switch. The medium may contain instructions to direct a processor of the network switch. The medium may include shared memory updating instructions to direct the processor to update a region of a memory shared with a network analysis data consumer with network analysis data and index storing instructions to direct the processor to store an index to the region in a database accessible by the network analysis data consumer.

FIG. 1 is a block diagram illustrating portions of an example network switch 20. Network switch 20 comprises a computer networking device that connects device together on a computer network using packet switching to route communications to a destination device. Network switch 20 may have various forms and may be referred to as a switching hub, bridging hub or an MAC bridge. In one implementation, network switch 20 may be a multiport network bridge that processes and forwards packets or data at a datalink layer using hardware addresses (MAC addresses). In some implementations, network switch 20 may additionally process data at a network layer (layer 3) by additionally incorporating routing functionality.

Network switch 20 facilitates the storage and provision of switch performance data in a timely and efficient manner while reducing the consumption of switch resources for the storage and provision of such switch performance data. Network switch 20 reduces reliance upon its switch database to maintain updated switch performance data. In particular, the network switch 20 utilizes a shared memory between the producer of the switch performance data and the consumer of the switch performance data. Updates to the switch performance data are made to the shared memory rather than the database. Network switch 20 comprises database 24, network analysis data producer 28, network analysis data consumer 34 and shared a memory 40.

Database 24 comprises a storage medium of switch 20. Database 24 is accessible by various consumers of switch performance data, such as various network analytics applications that may be running on switch 20. In some implementations, database 24 operates in accordance with various security protocols. For example, data stored by database 24 is copied to database 24, which includes encoding, transferring and decoding of the data. Database 24 stores index values associated with distinct regions of shared memory 40. Such index values may be in the form of addresses by which particular regions of shared memory 40 may be accessed. Such index values may be written in database 24 when the tracking of a particular switch performance attribute by producer 28 is begun. Such index values may be utilized by consumer 34 to locate a particular switch performance attribute stored in a particular region of shared memory 40.

Network analysis data producer 28 comprises those components of network switch 20 that track various switch performance attributes and output switch performance data. Examples of network analysis data producer 28, include, but are not limited to multiple counters that track traffic through the switch, such as traffic through particular ports, traffic through particular flow paths through the switch, traffic to or between virtual ports in the switch, the number of packets over time within a given queue, the time spent by a packet in a queue, traffic through a particular VLAN, and the like. Network analysis data producer 28 may also comprise any one of various counters contained in an application specific integrated circuit.

Network analysis data producer 28 triggers the storage of the network performance data index in database 24 when producer 20 begins to track a particular attribute of network performance data. Network analysis data producer 28 comprises an application program interface (API) 30 that further stores the tracked network performance data in the shared memory 40 at a particular region associated with the index assigned to the particular region and stored in database 24. Subsequent updates to the network performance data are also made by the API 30 of producer 28 to the assigned or indexed region of shared memory 40. In one example implementation, producer 28 may update a value of the network analysis data on the region shared memory 40 at a frequency of at least 10 times per second. In other implementations, producer may update a value of the network analysis data on the region shared memory 40 at a frequency of greater than once per second.

Because API 30 of producer 28 directly stores and continuously updates the tracked network performance data in shared memory 40 rather than copying the data from the memory of producer 28 two database 24, database overhead is reduced. Moreover, because the database does not store the continuously updated tracked values for the network performance data, but simply stores the index or address that locates the network performance data in the shared memory, database 24 undergoes changes at a lower frequency. As a result, database 24 performs fewer notifications to subscribers of database 24 regarding changes, further reducing database operational overhead.

Shared memory 40 comprises a memory, such as a block of random access memory, that may be accessed by different central processing units in a multiprocessor computer system. In the example illustrated, shared memory 40 comprises a memory that may be accessed by both producer 28 and consumer 34. Shared memory 40 may utilize uniform memory access, nonuniform memory access architecture. Shared memory 40 stores switch performance data, such as counter values, received from producer 28 through API 30 at distinct portions or regions of memory 40 that are addressed or indexed, wherein the address or index is also stored in database 24.

Network analysis consumer 34 comprises a consumer or user of the switch performance data stored in shared memory 40. Network analysis consumer 34 may comprise a switch or network analytics application that analyzes performance or settings of a switch based upon such network performance data. Network analysis consumer 34 may comprise a thread of a processing core that is executing a network analysis script. Other examples of network analysis consumer include, but are not limited to analytic engines, application program interfaces (APIs), command line interfaces, manageability protocols and the like. Network analysis consumer 34 may include a storage medium or memory storing index values identifying the addresses of particular regions of shared memory 40 at which particular types of network analysis data is stored. Network analysis consumer 34 includes an API 36 by which consumer 34 accesses the network or switch performance data stored in shared memory 40.

Network analysis consumer 34 comprises programming, code or instructions a direct a processing unit to retrieve and analyze switch data. When a particular type of switch data is to be accessed and retrieved, consumer 34 initially determines whether a location for the particular type of switch data is stored in the memory of consumer 34. Network analysis consumer 34 initially determines whether its storage contains an index value for the particular type of switch data to be retrieved. In response to the index value being stored at consumer 34, consumer 34 utilizes API 36 and the stored index value to retrieve the particular type of which data at the indexed location or region in shared memory 40. In response to the address or index value for the particular type of switch data being presently unknown to consumer 34, for example, not stored in a memory of consumer 34, consumer 34 retrieves the index value from database 34. The retrieved index value may then be stored by consumer 34 at consumer 34 for subsequent retrieval of the particular type of switch data. Once the index value has been retrieved, API 36 of consumer 34 may utilize the index value to retrieve the particular type of switch data at the index region or location in shared memory 40. Once retrieved, the particular type of switch data may be utilized by consumer 34 in its analysis of the performance of switch 20 and/or the network in which switch 20 resides. Such analysis may be utilized to alter operational parameters settings of switch 20 so as to alter the flow of packets or communications within switch 20 or through the network. Such analysis may be utilized to identify security concerns.

Figure 2:
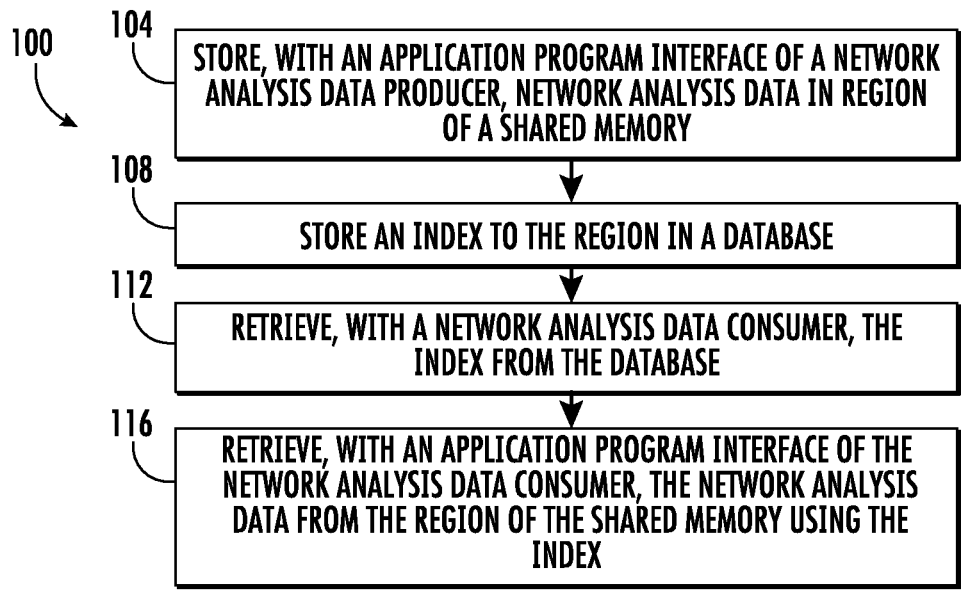
FIG. 2 is a flow diagram of an example switch performance data storage and retrieval method.

FIG. 2 is a flow diagram of an example switch performance data storage and retrieval method 100. Method 100 facilitates the storage and provision of switch performance data in a timely and efficient manner while reducing the consumption of switch resources for the storage and provision of such switch performance data. Although method 100 described in the context of being carried out by switch 20, it should be appreciated that method 100 may likewise be carried out with any of the following described switches or with similar switches.

As indicated by block 104, an application program interface of a network analysis data producer, such as producer 28, stores network analysis data in a region of a shared memory, such as memory 40. As indicated by block 108, in circumstances where the storage of the switch performance data to the region of the database 40 is being initiated, producer 28 further stores and index in a database, such as database 24. The index identifies a location or address of the region of the shared memory 40 at which producer 28 is storing or is about to store the produced network analysis data (also referred to as switch performance data).

As indicated by block 112, a network analysis data consumer, such as consumer 34, may subsequently retrieve the stored index from the database. Once retrieved, the index may be stored by the consumer for subsequent use, possibly eliminating subsequent retrievals of the particular index from database 24 by the consumer.

As indicated by block 116, an application program interface of the network analysis data consumer may retrieve the network analysis data from the region of the shared memory using the retrieved (or previously retrieved and stored) index. The network analysis consumer may utilize the retrieved network analysis data to alter parameter settings of the switch or otherwise alter the routing of communications through the switch or through the network in which switch 20 resides to enhance network performance.

Figure 3:
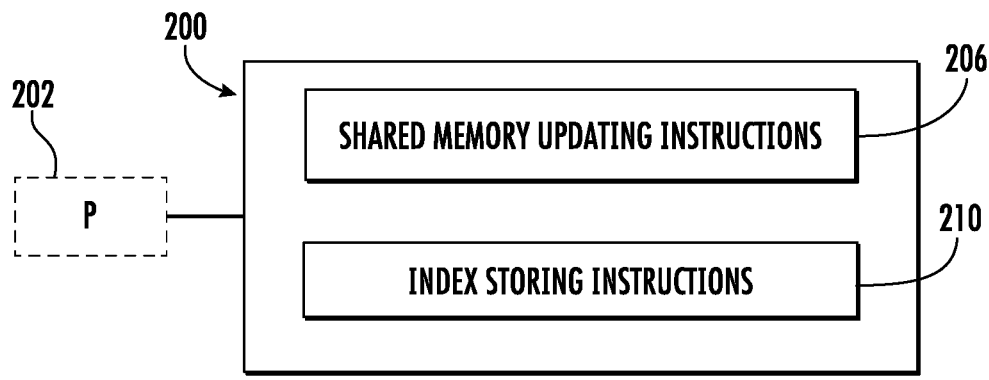
FIG. 3 is a block diagram schematically illustrating portions of an example non-transitory computer-readable medium for performing switch performance data storage and retrieval.

FIG. 3 is a block diagram schematically illustrating portions of an example non-transitory computer-readable medium 200 for controlling switch/network analysis data storage and retrieval on a network switch. Medium 200 contains instructions to direct a processor 202 (shown in broken lines) of a network switch. The instruction contained on medium 200 facilitate the storage and provision of switch performance data in a timely and efficient manner while reducing the consumption of switch resources for the storage and provision of such switch performance data. Medium 200 comprises shared memory updating instructions 206 and index storing instructions 210.

Shared memory updating instructions 206 direct processor 202 to update a region of a memory (such as memory 40) shared with a network analysis data consumer (such as consumer 34) with network analysis (also referred to as switch performance data). In one implementation, instructions 206 are part of an application program interface (such as interface 30) which stores and updates network analysis data in selected regions of shared memory 40. The network analysis data or switch performance data is described above.

Index storing instructions 210 (or a different processor) to store an index in a database (such a database 24). The index serves as an address or pointer to the location in the shared memory at which the network analysis data was stored. The database containing the index is accessible by network analysis data consumer. The network analysis consumer may access the database to retrieve the index and use the retrieved index to then retrieve the network analysis data from the shared memory. Once initially retrieved, the index may be stored by the consumer, allowing the consumer 34 two's subsequently retrieve updates to the network analysis data from the shared memory without having to once again retrieve the index for the network analysis data from database 24.

Figure 4:
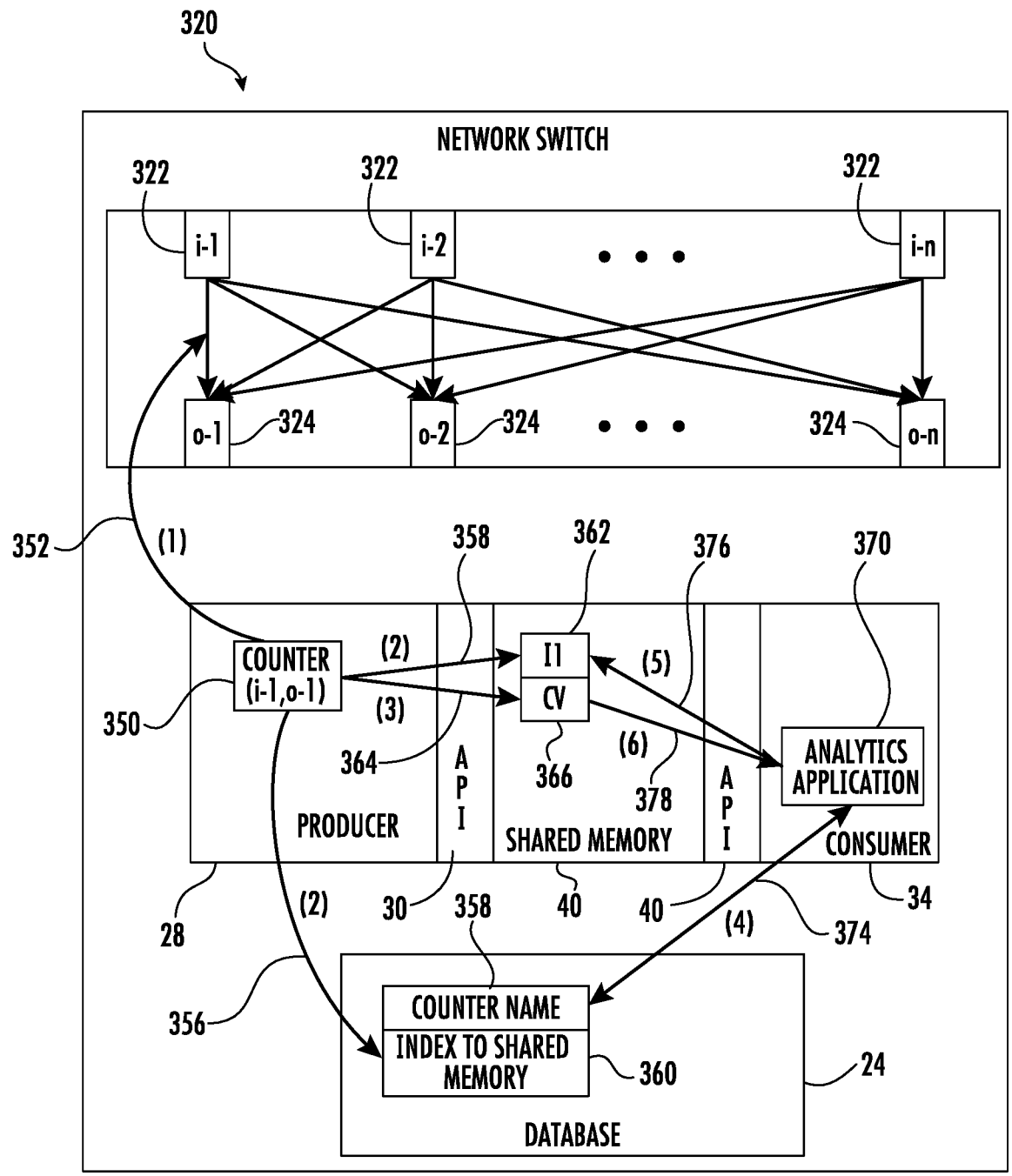
FIG. 4 is a block diagram schematically illustrating portions of an example network switch and an example series of switch performance data production, storage and retrieval events.

FIG. 4 is a block diagram schematically illustrating portions of an example network switch 320. FIG. 4 further diagrams an example switch performance data/network analysis data production, storage and retrieval series. Network switch 20 may include medium 200 and may carry out method 100 described above. Network switch 20 comprises a computer networking device that connects devices together on a computer network using packet switching to route communications to a destination device. Network switch 320 may have various forms and may be referred to as a switching hub, bridging hub or an MAC bridge. In one implementation, network switch 320 may be a multiport network bridge that processes and forwards packets or data at a datalink layer using hardware addresses (MAC addresses). In some implementations, network switch 320 may additionally process data at a network layer (layer 3) by additionally incorporating routing functionality.

Network switch 320 facilitates the storage and provision of switch performance data in a timely and efficient manner while reducing the consumption of switch resources for the storage and provision of such switch performance data. Network switch 320 reduces reliance upon its switch database to maintain updated switch performance data. In particular, the network switch 320 utilizes a shared memory between the producer of the switch performance data and the consumer of the switch performance data. Updates to the switch performance data are made to the shared memory rather than the database. Similar to network switch 20, network switch 320 comprises database 24, network analysis data producer 28, network analysis data consumer 34 and shared a memory 40, each of which is described above.

As further schematically shown by FIG. 4, network switch 320 comprises an array of input ports 322 (*i*-1 to i-n) and output ports 324 (*o*-1 to o-n). Input ports 322 receive network communications or traffic, generally in the form of packets, that are being routed by switch 320. Output ports 324 transmit such network communications or traffic towards a particular target destination. In some implementations, each input port is connectable to each output port. In other implementations, are connected to selected output ports.

In the example illustrated, network analysis data producer 28 comprises an example counter 350 left in schematically shown) for counting and measuring traffic flow from input port 322 i-1 two output port 324 o-1 as indicated by arrow 352 (1). When the tracking of such traffic is initiated, producer 28 determines the particular region of shared memory 40 at which the values for counter 350 will be stored or at which the values are being stored. As indicated by arrow 356 (2), producer 28 stores an entry in database 24 associating the counter name 358 (an identifier of the switch performance data/network analysis data being stored) to an index 360 which is an address or identifies an address of the shared memory 40 from which the data may be retrieved. As indicated by arrow 358 (2) producer 28, before, concurrently with or after the storage of the index 360 in database 24, also establishes an indexed location 362 at which counter values CV from counter 350 are to be stored in shared memory 40. As indicated by arrow 364, once the index region 362 has been established, producer 28 stores and updates the counter value 366 in the shared memory. In the example illustrated, the establishment of the index region 362 and the updating of the counter value 366 by producer 28 is performed using the API 30 of producer 28. Because the database 24 does not store the continuously updated tracked values for the network performance data, but simply stores the index 360 or address that locates the network performance data in the shared memory, database 24 undergoes changes at a lower frequency. As a result, database 24 performs fewer notifications to subscribers of database 24 regarding changes, further reducing database operational overhead.

In the example illustrated in FIG. 4, the network analysis data consumer 34 may comprise an analytics application 370. As described above, in other applications, consumer 34 may comprise other forms of switch performance data consumers. When set up or thereafter, consumer 34 may prescribe analysis using the counter value 366 produced by counter 350. Consumer 34 may first determine whether or not consumer 34 has learned of the location and shed memory 44 counter value 366. In doing so, consumer 34 may search its memory for an index value associated with the counter value 366. As indicated by arrows 374 (4), in response to not identifying a previously retrieved index value for counter value 366, consumer 34 may access database 24, providing database 24 with the counter name 358, wherein database 24 may respond by providing consumer 34 with the index 360 associated with the requested counter name 358. Once retrieved, the index 360 may be stored by the consumer 34 for subsequent use, allowing analytics application 370 or consumer 34 to subsequently and repeatedly access the counter value 366 (as it is updated) in shared memory 40 without consulting database 24. Because the index is no longer retrieved from the database 24, database processing overhead may be reduced.

As indicated by arrow 376 (5), the retrieved index value 362 is utilized by the API 36 of consumer 34 to identify the location of shared memory 40 at which switch performance data/network analysis data is requested. As indicated by arrow 378 (6), API 36 retrieves the counter value 366 for use by the analytics application 370. Analytics application 370 may analyze such data to alter operational parameters settings of switch 320 so as to alter the flow of packets or communications within switch 320 or through the network. Such analysis may be utilized to identify security concerns.

Although the present disclosure has been described with reference to example implementations, workers skilled in the art will recognize that changes may be made in form and detail without departing from the disclosed subject matter. For example, although different example implementations may have been described as including features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A network switch comprising:
    a database;
    a network analysis data producer having a first application program interface;
    a network analysis data consumer having a second application program interface; and
    a shared memory accessible by the first application program interface and the second application program interface, wherein the network analysis data producer is to:
    store network analysis data on a region of the shared memory; and
    store an index to the region in the database for retrieval by the network analysis data consumer.

2. The network switch of claim 1, wherein the network analysis data producer comprises a counter and wherein the network analysis data comprises a value of the counter.

3. The network switch of claim 2, wherein the network analysis data consumer comprises a thread of a processing core executing a network analysis script.

4. The network switch of claim 1, wherein the network analysis data producer is to update a value of the network analysis data on the region of the shared memory at a frequency of at least once per second.

5. The network switch of claim 4, wherein the network analysis data comprises a counter.

6. The network switch of claim 1, wherein the network analysis data comprises data selected from a group of data consisting of traffic through particular ports, traffic through particular flow paths through the switch, traffic to or between virtual ports in the switch, the number of packets over time within a given queue, time spent by a packet in a queue, traffic through a particular VLAN.

7. The network switch of claim 1, wherein the network analysis data consumer comprises a thread of a processing core executing a network analysis script.

8. The network switch of claim 1, wherein the network analysis data consumer is to retrieve the index from the database and retrieve network analysis data from the shared memory using the index.

9. The network switch of claim 8, wherein the network analysis data consumer is to retrieve the network analysis data from the shared memory at a frequency of at least once per second.

10. The network switch of claim 1, wherein the network analysis data consumer is selected from a group of consumers consisting of analytic engines, application program interfaces (APIs), command line interfaces, and manageability protocols.

11. The network switch of claim 1, wherein the network analysis data producer is selected from a group of producers consisting of counters on an application specific integrated circuit.

12. A method comprising:
    storing, with an application program interface of a network analysis data producer, network analysis data in region of a shared memory;
    storing an index to the region in a database;
    retrieving, with a network analysis data consumer, the index from the database; and
    retrieving, with an application program interface of the network analysis data consumer, the network analysis data from the region of the shared memory using the index.

13. The method of claim 12, wherein the network analysis data producer comprises a counter and wherein the network analysis data comprises a value of the counter.

14. The method of claim 12, wherein the network analysis data consumer comprises a thread of a processing core executing a network analysis script.

15. The method of claim 12 further comprising updating a value of the network analysis data on the region of the shared memory at a frequency of at least once per second.

16. The method of claim 12, wherein the network analysis data comprises data selected from a group of data consisting of traffic through particular ports, traffic through particular flow paths through the switch, traffic to or between virtual ports in the switch, the number of packets over time within a given queue, time spent by a packet in a queue, and traffic through a particular VLAN.

17. The method of claim 12 further comprising retrieving the network analysis data from the shared memory at a frequency of at least once per second.

18. The method of claim 12, wherein the network analysis data consumer is selected from a group of consumers consisting of analytic engines, application program interfaces (APIs), command line interfaces, and manageability protocols.

* * * * *